April 21, 1953  R. D. SCHESKE  2,635,692
SPEED REGISTERING DEVICE
Filed Aug. 2, 1951  3 Sheets-Sheet 1

INVENTOR
Roy D. Scheske.
BY Frank C. Larman
ATTORNEY

April 21, 1953     R. D. SCHESKE     2,635,692
SPEED REGISTERING DEVICE
Filed Aug. 2, 1951     3 Sheets-Sheet 2
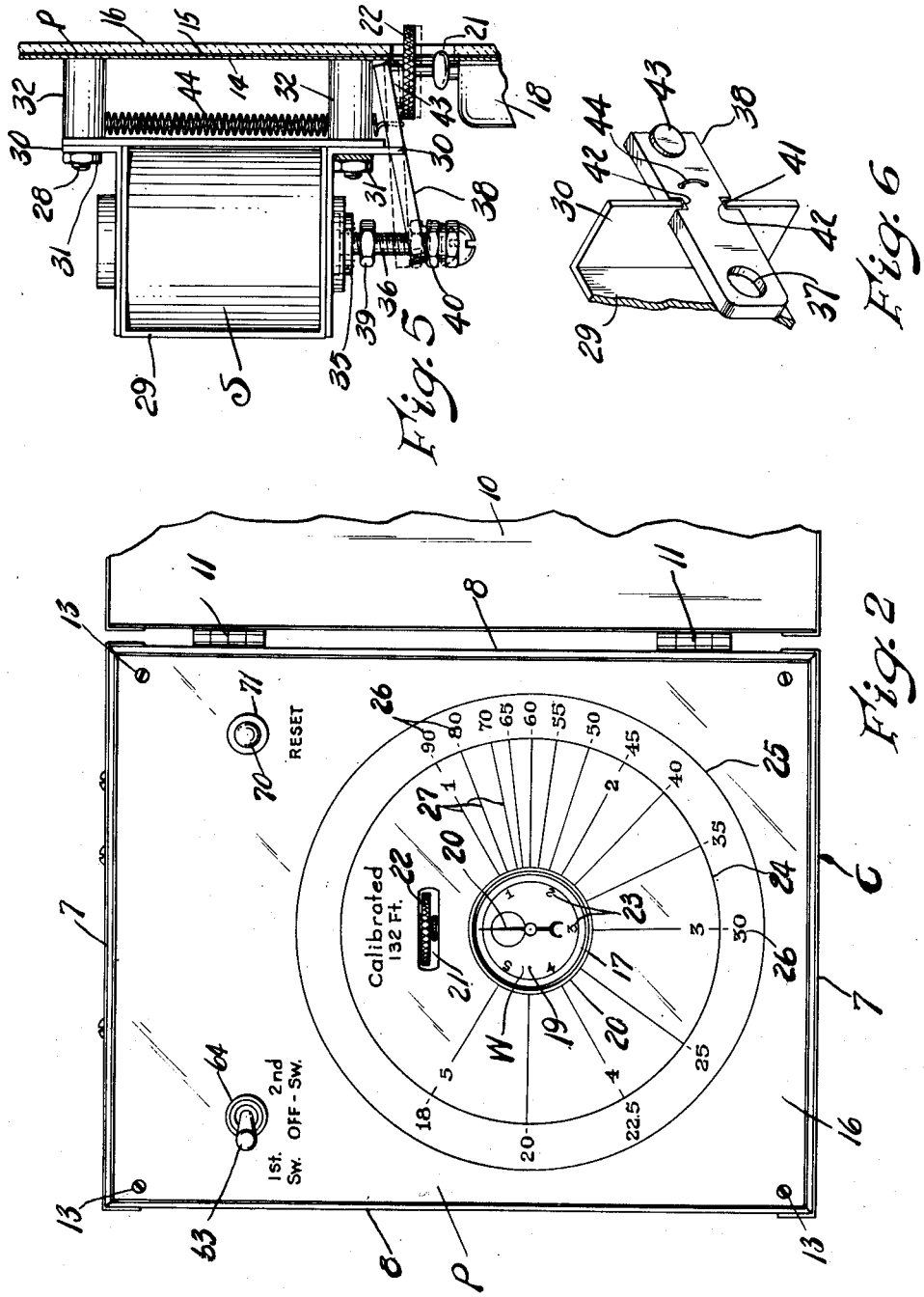
INVENTOR.
Roy D. Scheske.
BY Frank C. Karman.
ATTORNEY April 21, 1953 R. D. SCHESKE 2,635,692
SPEED REGISTERING DEVICE
Filed Aug. 2, 1951 3 Sheets-Sheet 3
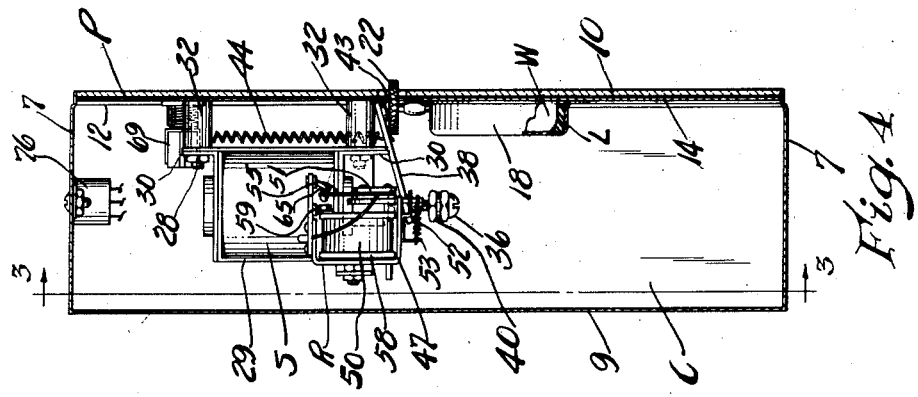
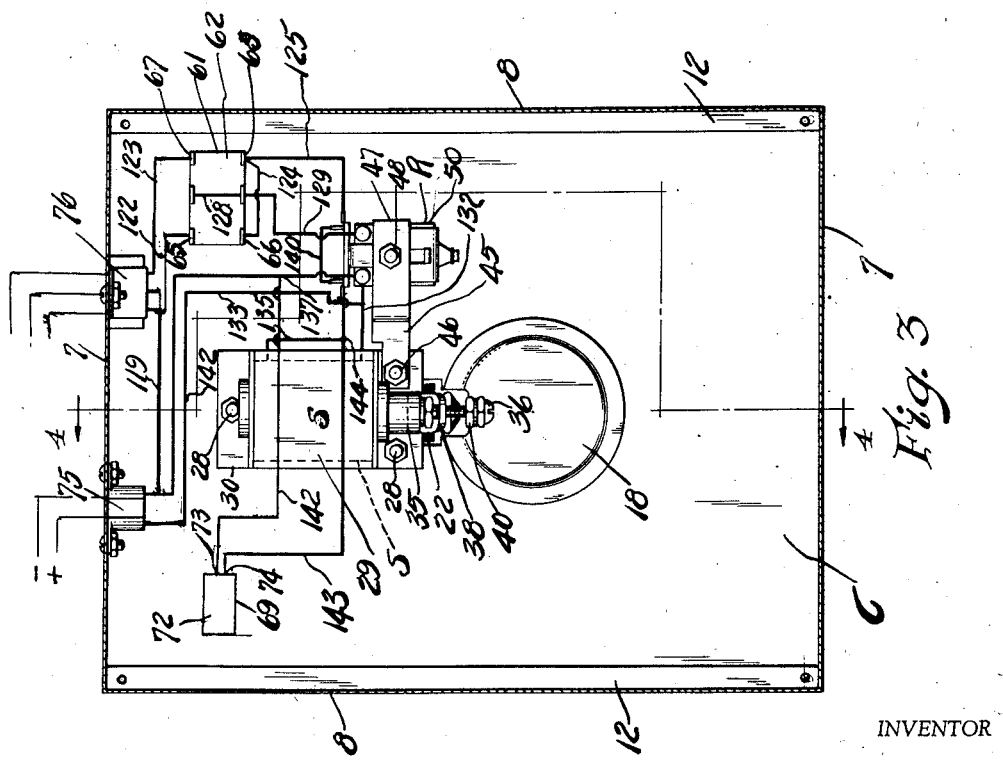
INVENTOR
Roy D. Scheske.
BY Frank C. Learman.
ATTORNEY Patented Apr. 21, 1953

2,635,692

UNITED STATES PATENT OFFICE 2,635,692

SPEED REGISTERING DEVICE

Roy D. Scheske, Marshall, Mich., assignor to Traffic House, Inc., Marshall, Mich.

Application August 2, 1951, Serial No. 239,887

4 Claims. (Cl. 161—18)

The present invention relates to improvements in apparatus for indicating the rate of speed of motor vehicles and the like, and more particularly to an indicating apparatus adapted to be positioned along a highway to indicate the average rate of speed of a selected motor vehicle traversing a predetermined distance on a pre-selected length of roadway.

One object of the invention is to provide an indicating apparatus which is adapted to give an accurate indication of the average rate of speed of a motor vehicle traveling along a highway, which can be conveniently set up and operated by but one man, for the purpose of compiling data relative to traffic speed surveys, and for indicating vehicles exceeding the maximum safety speed limit along said highway for apprehension purposes.

Another object is to provide an indicating apparatus for providing an accurate reading in miles per hour of a selected vehicle in a group of vehicles traveling along a highway.

Another object is to provide an indicating apparatus for indicating the average rate of speed of a vehicle which can be selectively controlled by an authorized person to condition the apparatus for indicating the average rate of speed of a motor vehicle traveling along a road pathway of a predetermined length, whereby the officer or authorized person will be given a visible indication of the exact speed of the motor vehicle traveling along said pathway.

Another object is to provide a speed indicating device of the above-mentioned type in which a pair of compressible tubes are arranged transversely of a highway in such a manner that the vehicle wheels passing over said tubes will compress the same, and thereby close a switch to produce a starting impulse in the registering apparatus which will start a stop watch which will continue to operate until the vehicle wheels pass over the second compressible tube, at which time the stop watch will be stopped and the pointer thereof will indicate the average rate of speed of the vehicle in miles per hour to the operator or authorized person.

Another object is to provide a speed indicating apparatus in which the compressible tubes are adapted to operate a pressure fluid device which actuates a mercury switch to close a circuit through an actuating solenoid for the stop watch.

Another object is to provide a speed indicating apparatus having a manually controlled re-setting switch which may be manipulated after a speed indication has been given to return the pointer to the zero position.

Another object is to provide an average rate of speed indicating apparatus in which the mercury switches actuated by the compressible tubes are adapted to be alternately and manually connected in a normally open relay circuit which, when energized, closes a switch in a separate circuit to energize the actuating solenoid and thus further eliminate inaccurate readings liable to be created by the passage of both vehicle wheels over the compressible tubes. Thus, even though the front wheels of the vehicle pass over the compressible tube at one end of the predetermined length of highway to energize the relay circuit, the rear wheels will not produce another effective impulse due to the holding relay maintaining the circuit closed until manually changed or opened and the actuating solenoid is energized through a separate circuit independent of the relay.

Another object is to provide a rate of speed indicating apparatus which can be operated from a suitable source of direct current supply such as a storage battery of low voltage, thus eliminating the need for currents of sufficient voltage to operate electric motors and the like and enabling the device to be easily transported and set up along different sections of a highway for the collection of data relating to speed conditions on said highway.

Another object is to provide a speed indicating apparatus having quick detachable electrical connectors associated therewith for accommodating cables from the source of current supply and from the electric mercury switches which are controlled by the compressible tubes. Thus, the storage battery can be conveniently plugged in or electrically connected to the apparatus, and similarly, the conductors from the mercury switches can be plugged in or electrically connected to the indicating apparatus conveniently and quickly.

Other objects and advantages of the invention will become apparent during the course of the following description of the accompanying drawings wherein:

Figure 2 is a face elevational view of the instrument casing showing the cover (broken away) in its open position, and illustrating the panel upon which the various instruments are supported.

Figure 3 is an inverted, sectional plan view taken on line 3—3 of Figure 4, and looking in the direction of the arrows, to indicate the position of the various instruments.

Figure 4 is a longitudinal cross-sectional view taken on line 4—4 of Figure 3, looking in the direction of the arrows to further indicate the manner in which the instruments are supported, and showing the manner in which the control solenoid is positioned to actuate the stem of the stop watch.

Figure 5 is an enlarged fragmentary and sectional edge elevational view of the instrument panel showing the manner in which the actuating solenoid is supported on the rear thereof, and showing the actuating lever controlled by the solenoid for starting and stopping the stop watch when the actuating lever is moved from its full line position to its dotted line position.

Figure 6 is a fragmentary, perspective view of the solenoid bracket and actuating lever.

Figure 1:
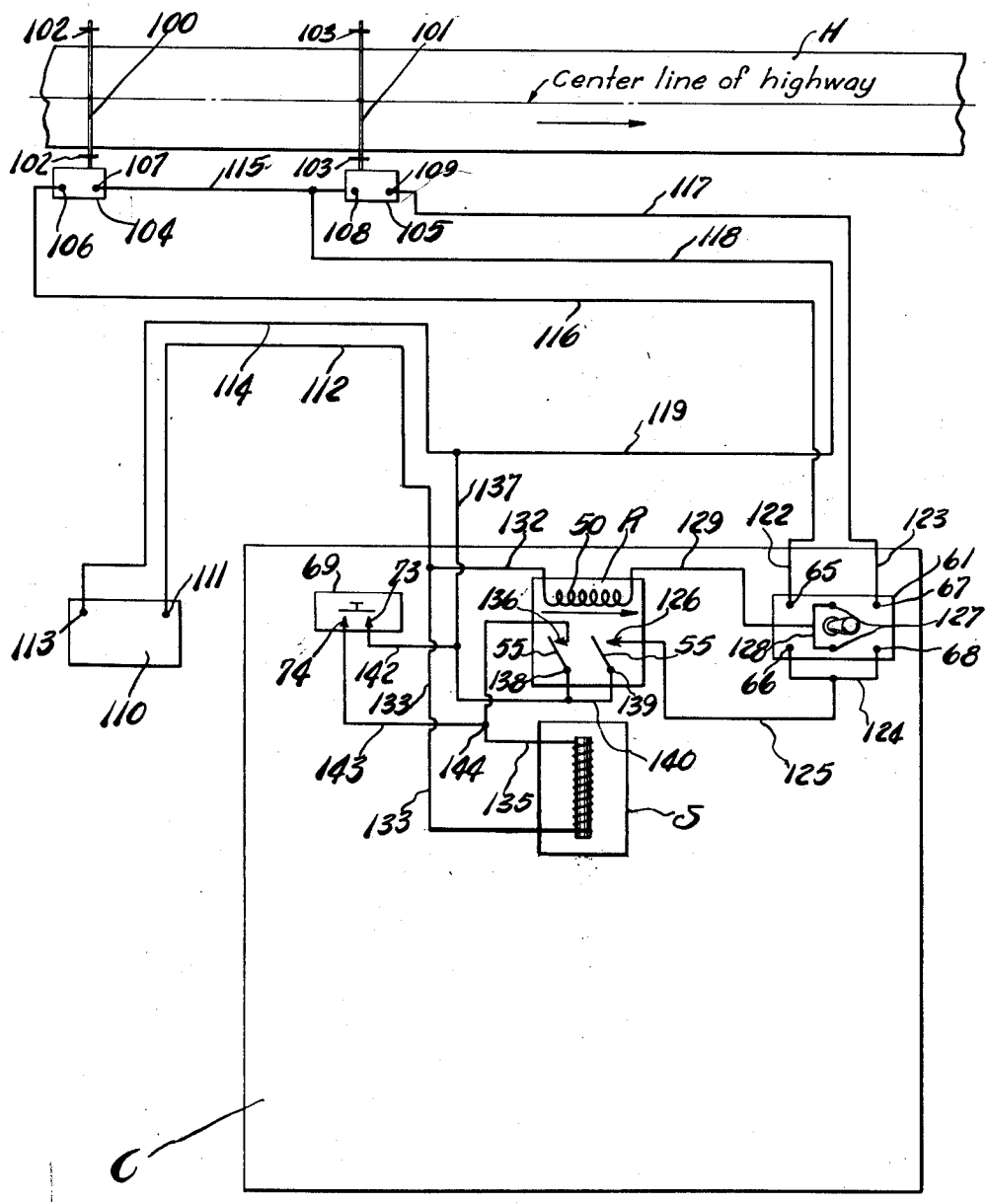
Figure 1 is a diagrammatic view illustrating the electrical wiring in the instrument casing for the various component parts, and showing the manner in which the compressible tubes are arranged transversely of a roadway such that passage of a vehicle thereover will actuate the mercury switches in succession to produce the start and stop motion of the stop watch.

In the drawings, and more in detail, attention is first directed to Figures 2, 3 and 4, wherein the reference character C will generally designate an instrument casing which may be formed of metal or any other desired material and includes end, side and bottom walls 7, 8 and 9 respectively. A cover 10 is hingedly connected to the casing by means of hinges 11 and forms a closure for the open top of the casing. Inwardly projecting flanges 12 are provided on the side walls 8 directly adjacent the upper end of the casing, and an instrument panel P is detachably mounted thereon by means of screws 13.

The instrument panel can be formed of any desired material, and in the present instance comprises a sheet metal panel 14 having a printed cardboard 15 mounted thereon, and a sheet of transparent Plexiglas 16 is super-imposed on said cardboard, the face of which is printed and is clearly visible through the Plexiglas (Fig. 2). The indicating mechanism is secured to the lower or rear face of the instrument panel and in a manner to be hereinafter more fully described.

A circular opening 17 is provided in the cardboard and Plexiglas panel 15 and 16 respectively, and opens into a depressed pocket 18 provided in the panel 14, which pocket is of a size to accommodate a stop watch W, a resilient liner L (Fig. 4) being provided in the pocket to absorb shocks and prevent injury to the watch mechanism, the face of the watch being substantially flush with the upper face of the instrument panel so that the dial 19 and hand 20 of the stop watch is clearly visible to an officer or other authorized person facing the instrument panel during a registering operation.

An opening 21 is provided in the instrument panel P directly above the opening 17, and accommodates a knurled crown disk 22 which forms a part of the stem of the watch. The stop watch dial is provided with second indications or markings 23 which are arranged progressively clockwise, and the stop watch is provided with a stop watch movement of conventional design excepting that the crown disk 22 replaces the usual crown (not shown). When the crown disk 22 is depressed, it starts the watch movement and causes the hand 20 to rotate in a clockwise direction. When the crown disk is again depressed, the movement is arrested, and the hand 20 will indicate elapsed seconds from the moment of initial depression. When the crown disk is depressed a third time the second hand 20 will be re-set to the starting position. The disk 22 projects through the opening 21 to facilitate winding the watch movement without removing it from the pocket or seat.

The instrument panel P is graduated inversely to indicate the average rate of speed in miles per hour for a distance of 132 feet with a six seconds watch, and as shown in Figure 2 concentric scale markings 24 and 25 on different radii provide an annular space for receiving rate of speed indications or markings 26.

Radial lines 27 extend from the dial 19 to the concentric marking 24, and certain of said radial markings 27 register with the second and rate of speed markings 23 and 26 respectively. Thus, the time markings 23 spaced a distance to indicate one second, are in alinement with the radial markings 26 which indicate the rate of speed. For instance, the marking 23 indicating one second, is in alinement with the radial marking or rate of speed indication designating a speed of 90 miles per hour, while the second indication or numeral 23 designating three seconds elapsed time is in radial alinement with the rate of speed marking "30" as at 26; thus as the elapsed time increases, the rate of speed decreases, and since the compressible tubes are spaced a distance of 132 feet apart or one-fortieth of a mile, a correct reading will be given on the secondary dial 26 in miles per hour.

Suspended on the lower or rear face of the instrument panel P by means of bolts 28 is a bracket 29 including flanges 30, the bolts 28 extending through openings in said flanges with nuts 31 threaded on the ends of said bolts 28 as usual, and spacers 32 are provided on the bolts for properly spacing the bracket from the lower face of the instrument panel.

A solenoid S is mounted on the bracket 29 and is provided with a coil winding which, when electrically energized, will produce induction currents in the usual manner. The solenoid is provided with a movable armature 35 adapted to move inwardly under the influence of the induced current when the winding of the solenoid (not shown) is energized. One end of the armature normally projects through the end wall of the bracket 29, and a screw 36 is threaded into the end wall of the armature as shown, said screw extending through an opening 37 provided adjacent the lower end of the actuating lever 38, and adjusting nuts 39 and 40 are mounted on the screw 36 to adjust the actuating lever and in a manner to be presently described.

The one flange 30 of the bracket 29 is cut away as at 41 to accommodate the actuating lever 38 (see Fig. 6 of the drawing), the side edges of the lever being notched as at 42 to loosely engage the abutting edges of the bracket flange 30, thus holding the lever in position and the flange providing a fulcrum for said lever. The free end of the lever 38 has a resilient disk 43 provided thereon, which disk engages the crown disk 22 of the watch for depressing the stem when the solenoid is energized and actuated. A spring 44 is anchored to the actuating lever 38 directly below the bracket flange 30, thence being anchored to the opposite flange as shown, said spring tending at all times to force the armature outwardly and permitting the watch stem to return to its original position.

Mounted directly adjacent the solenoid S is a single pole double throw normally open relay R, and said relay is supported on a strap 45 which strap is secured to the flange 30 of the bracket 29 by means of a bolt 46, with the opposite end connected to the frame 47 of the relay R by means of the screw and nut connection 48. This relay frame is of U-shaped construction and supports a magnetic core (not shown) having a conventional coil winding 50 which when energized is adapted to attract a spring biased armature 51 which is rockably mounted on one of the legs of the frame 47, and is provided with a small coil spring 52 which has its other end connected as at 53 to a hook on the corresponding leg of the frame 47. Normally, the coil winding 50 is not energized, but when the same is energized, the armature 51 is attracted by the magnetic core.

Secured to the armature 51 is a pair of movable contact blades 55 which are normally urged into engagement with stops 56 supported on the opposite leg of the U-shaped frame 47 (Fig. 4). The contact blades 55 are provided on their ends with conventional contact points adapted to engage fixed contact points 59 which are suitably insulated from the frame 47. For the purpose of clarity a pair of said contact blades 55 with the contacts on the ends thereof are arranged to engage correspondingly spaced fixed contacts 59.

Also mounted on the rear wall of the instrument panel P is a double pole, double throw, center-off, toggle switch generally designated 61 including a casing 62 (Fig. 3). The manually operable toggle lever 63 of the toggle switch projects through a bushing 64 in the instrument panel P, and the face of the panel is marked with legends "1st. Sw," "off," and "2nd. Sw." Thus, when the toggle lever 63 is in its left hand position (Fig. 2) the switch blade of the switch 61 will be connected to the fixed contacts 65 and 66 of the toggle switch 61, and similarly, when the toggle lever 63 is in its right hand or second switch position, the switch blades will be in contact with the switch fixed contacts connected to terminals 67 and 68. When the toggle lever 63 is in its intermediate position or in registry with the legend "off," the switch blades will be out of engagement with both sets of fixed contacts 65—66 and 67—68.

A re-setting switch generally designated 69 is also mounted on the instrument panel adjacent the upper right hand corner thereof and is provided with a manually operable push-button 70 which extends through a bushing 71 in the instrument panel P. The casing 72 of the switch 69 is secured in place in the usual manner, and is provided with contact terminals 73 and 74, one of which is connected to the movable contact switch blade, while the other is connected to a fixed contact engageable by said movable contact blade in a conventional manner. The contact blade may be a spring type blade to normally hold the contacts 73 and 74 open and the circuit broken.

A female socket member 75 is mounted in the end wall 7 of the casing, and said socket member is provided with a pair of spaced contacts (not shown) for receiving the prongs correspondingly spaced of a male connector or plug, likewise not shown. The connector plug may have a pair of contact prongs which are connected to a source of electrical energy such as a direct current storage battery by means of a suitable flexible cable. Similarly, a female electrical socket member 76 is mounted on the end wall 7 of the casing and is provided with terminals for receiving the male contact terminals of a three prong plug (not shown) on the end of an electric cable which is adapted to extend to the mercury switches along the highway in a manner which will be presently described.

Attention is now directed to Figure 1 of the drawings showing a combination circuit diagram of the various instruments looking at the back of the casing, similar to Figure 3, and also showing a plan view of a highway schematically illustrating the relative position of the apparatus shown in Figures 2 to 6 inclusive with respect to said highway. It is intended to place the instrument casing at a convenient location along the highway H (Fig. 1), where data relative to excessive speed conditions is desired to be compiled. Extending transversely of the highway H is a pair of collapsible tubes 100 and 101, which are arranged a distance of 132 feet apart, and are secured in place by anchors 102 and 103 respectively at the sides or shoulders of the highway. The collapsible tubes 100 and 101 are formed of rubber and are adapted to be compressed by the passage of the wheels of a vehicle thereover. The tubes are plugged at the center, and this plugged point is placed on the center line of the highway so that impulses are received only from vehicles traveling in the lane of the direction being checked.

The end section of each tube disposed in the highway lane being checked, is connected to a pressure responsive device such as a conventional rubber diaphragm operatively connected to tilt mercury switches 104 and 105. The compressible tubes 100 and 101 are preferably filled with air, such that when the wheels of a vehicle pass thereover, the developed pressure will actuate the diaphragm of a corresponding mercury switch and move the same a slight distance. The diaphragm is connected to a mercury switch of the tiltable type (not shown), and is mounted in the switch housings 104 and 105. The switch housings 104 and 105 are arranged along one side of the highway H, and the contacts of the mercury switches are connected to terminals 106—107 and 108—109 (Fig. 1).

A suitable direct current source of electrical energy such as a 6 volt storage battery 110 is provided, and has its positive terminal 111 provided with a flexible cable 112 which is connected to a male plug member (not shown) for connection to the socket 75. The negative terminal 113 of the storage battery 110 is similarly provided with a flexible cable 114 which is connected to the other prong or connection of said male plug.

The terminals 107 and 108 of the mercury switches 104 and 105 are electrically connected by a cable 115, and the terminals 106 and 109 of the respective mercury switches 104 and 105 are provided with flexible electric cables 116 and 117 respectively. A flexible electrical conductor 118 has one end connected to the cable 115 connecting the contacts 107 and 108 of the mercury switches 104 and 105, and the end of said flexible conductor along with the ends of the flexible conductors 116 and 117 are brought into a three-prong electrical connector of the plug type, and are individually electrically connected to the prongs of said connector. The prongs of the connector correspond in position with the female sockets in the detachable connector 76.

The flexible conductor 118 is connected to a central prong of the two-part connector, and the corresponding socket opening for said prong in the receptacle 76 is electrically connected to one socket terminal of the electrical connector 75 by an electrical conductor 119. Thus, current is supplied from the storage battery to one side of the mercury switches 104 and 105 through the branch conductor 115.

Since the wiring diagram in Fig. 1 of the instrument is taken from the reverse side thereof corresponding in position to Fig. 3, the description of the wiring diagram to follow will be in accordance with the showing in these two figures concerning the component electrical devices R, S, reversible selector switch 61 and re-setting switch 69.

In Figs. 1 and 3, the electrical conductor 116 is adapted to be connected to the terminal 65 of the toggle switch 61 through the plug receptacle 76 by an electrical conductor 122. Similarly, the flexible conductor 117 is connected to the contact terminal 67 of the toggle switch 61 by means of an electrical conductor 123. The terminals and their contacts 66 and 68 are bridged by an electrical conductor 124 and a conductor 125 connects the bridge to one of the fixed contacts 126 of the normally open relay R. The double poles 127 of the toggle switch 61 are bridged by a connector 128, and said bridge 128 is electrically connected to the coil winding 50 of the normally open relay R by a conductor 129. The other terminal of the relay coil winding is electrically connected by means of a conductor 132 to a conductor 133 connected to one of the terminals of the solenoid coil winding of the solenoid S. An electrical conductor 135 is connected to the other terminal of the solenoid coil winding S and is electrically connected to one of the fixed contacts 136 of the normally open relay R. The electrical conductor 133 is connected to the storage battery 110 through the plug receptacle 75 and electrical conductor 112.

The other terminal of the plug 75 has connected thereto a conductor 137 which is electrically connected to the terminals 138 and 139 of the movable switch blades 55. Thus, when the winding 50 of the relay R is energized the switch blades 55 will move into contactual engagement with their contacts 126 and 136 and maintain a holding circuit in the winding 50 to hold the contacts 136 and 138 bridged and establish an energizing current for the coil winding of the solenoid S. The terminals 138 and 139 are bridged by an electrical conductor 140, and the electrical conductor 137 from one side of the battery 110 will supply electrical energy for both the holding circuit and the solenoid coil winding circuit of the solenoid S.

The re-setting switch 69 has one of its terminals 73 connected to the conductor 137 by an electrical conductor 142, and the other terminal 74 of the re-setting switch 69 is electrically connected to the conductor 135 by an electrical conductor 143 as at 144.

Thus, it will be seen, that when either one of the mercury switches 104 or 105 are closed momentarily by the wheels of a motor vehicle passing thereover, the relay winding 50 will be energized and the coil winding of the solenoid will be simultaneously energized if the handle 63 of the toggle switch 61 is in the corresponding switch position. Upon energization of the relay winding 50 the movable contact blades 55 are moved into engagement with their corresponding fixed contacts 126 and 136. This closes a circuit through the winding 50 of the relay to the conductor 125 and closes a circuit through the winding of the solenoid S through the contact 136 and conductor 135. It being remembered that the conductor 137 is connected to one terminal of the storage battery and connects with both terminals 138 and 139 of the normally open holding relay R.

In operation, let it be assumed that the observer or authorized person views a motor vehicle traveling along the highway H and moving in a direction from left to right in Fig. 1, and approaching the compressible tube 100. The operator or authorized person will then manipulate the switch handle 63 of the toggle switch 61 to shift the blades 127 thereof into contactual engagement with the fixed switch contacts 65 and 66. In this switch blade position, the toggle lever 63 will be in the first switch position as indicated in Fig. 2. With the toggle switch in this position, the various instruments are conditioned for operation and energization through the mercury switch 104, and as the vehicle wheels pass over the compressible tube 100 to actuate the mercury switch 104, a circuit is established as follows: From the positive terminal of the storage battery 110 through conductor 112, conductor 132, relay coil winding 50, conductor 129, one of the switch blades 127 through conductor 122, flexible conductor cable 116, mercury switch 104, branch conductor 115, flexible conductor 118, electrical conductor 119 and thence to the negative terminal 113 of the battery through the flexible cable 114. As the winding 50 is thus energized the switch blades 55 move into contactual engagement with their contacts 126 and 136. This establishes a holding circuit for the relay R and simultaneously closes a circuit through the coil winding of the solenoid S through conductors 112, 133, 135, fixed contact 136, switch blade 55, terminal 138 and thence back to the negative terminal 113 of the battery through electrical conductor 137 and flexible cable 114. The moment the solenoid winding of the solenoid S is energized, the stem 21 of the stop watch is depressed, thereby starting said stop watch in motion by releasing the watch movement thereof. At the same time that the switch blade 55 engages the contact 136, the switch blade 55 will engage the fixed contact 126 to establish a holding circuit through the coil winding 50 of the relay R. The circuit is then from the positive terminal 111 of the storage battery through the flexible conductor cable 112, electrical conductor 132, coil winding 50, electrical conductor 129, to the other switch blade 127 through the branch connection 128, contact 66, branch connector 124, electrical conductor 125, switch contact 126, switch blade 55, switch blade terminal 139, electrical conductor 140 and thence back to the negative terminal 113 of the battery through the electrical conductor 137 and flexible cable 114. Thus, it will be seen that the movable switch blades 55 will be held in their closed position in engagement with their corresponding contacts 126 and 136 upon initial contact of the vehicle wheels with the compressible tube 100. After the vehicle has passed over the compressible tube 100, the operator or authorized person manipulates the toggle switch lever 63 to shift the same to the second switch position, which movement interrupts the circuit through the coil winding 50 of the relay R and permits the movable switch blades 55 to separate from their corresponding contacts 126 and 136 and be moved to their normally open position. Simultaneously, the coil winding of the solenoid S is de-energized so that the spring 44 will move the actuating lever 38 back to its original position (see Figs. 3 and 5).

Although the stem of the stop watch is released, the indicator pointer or hand 20 continues to move clockwise and is stopped when the stem 22 is again depressed by the travel of the motor vehicle over the second compressible tube 101.

Movement of the vehicle over the second compressible tube 101 again causes the coil winding 50 of the relay R to be energized and the circuit is as before except that the mercury switch 105 is connected in the circuit through the contacts 67 and 68 in identically the same manner as pointed out when the switch blades 127 are in contactual engagement with the switch contacts 65 and 66.

However, the circuit will be through the mercury switch 105 as follows: From the storage battery 110, flexible cable 112, conductor 132, relay winding 50, conductor 129, through one of the switch blades 127, switch contact 67, electrical conductor 123, flexible cable 117, switch contacts 109 and 108 and thence to the negative terminal of the battery 113 through the branch connection 115, flexible cable 118, electrical conductor 119 and flexible cable 114. When the relay winding 50 is energized the pair of switch blades 55 engage their respective contacts 126 and 136 to again maintain the holding circuit and simultaneously energize the winding of the solenoid S. As this occurs, the stem 21 of the stop watch W is again depressed to arrest the motion thereof and stop the hand 20 in registry with one of the speed indications between the concentric circles 24 and 25. The operator or authorized person will then be given a fair and accurate reading of the average speed for a distance of 132 feet.

In order to re-set the hand 20 to its zero position, the switch 69 is manually closed by pressing the button 70. Closing of the switch 69 causes the winding of the solenoid S to be energized from the positive side of the battery 111, flexible cable 112, electrical conductor 133, through the electrical conductor 143 to the closed contacts 74—73, through electrical conductor 142 to the electrical conductor 137 and thence back to the negative terminal of the battery 113 through the flexible conductor 114. When the solenoid S is thus energized the armature 35 again depresses the stem 21 through the actuating lever 38 which causes the pointer 20 to rotate clockwise to its starting position, thus re-setting the stop watch.

Since it is customary for the operator to shift the toggle switch lever 63 after a vehicle has passed over one of the compressible tubes, the circuit through the relay winding 50 is interrupted and consequently the coil winding of the solenoid S is likewise de-energzied.

After each checking operation, the manual push-button 70 of the re-set switch 69 is actuated by the operator to restore the stop watch hand 20 to its zero setting or position.

It is to be understood that dial calibrations for different distances and/or watch speeds may be utilized if desired; the form of the invention herewith shown and described being taken as a preferred embodiment and in which various changes in the shape, size and arrangement of parts may be resorted to without departing from the spirit of the invention or the scope of the subjoined claims.

What I claim is:

1. In an apparatus for indicating the rate of speed of a vehicle traveling along the highway, a pair of pressure-operated mercury switches, a compressible tube associated with each switch and extending transversely of the highway in spaced relation a predetermined distance apart, said switches being operable by the front wheels of a vehicle passing over said compressible tubes, a housing, a stop watch mechanism in said housing having a start and stop control member which successively starts and stops said mechanism upon successive depressions thereof, and a dial graduated inversely to time lapse to indicate miles per hour, a horizontally disposed, resilient lever hingedly mounted intermediate its ends in said casing and having one end extending adjacent said start and stop member, a solenoid having a central armature normally disposed adjacent the opposite end of said lever and adapted to move laterally when said solenoid is energized to engage the one end of said lever and tilt the opposite end of said lever to depress said start and stop member, a relay with a winding, and with normally spaced-apart pairs of contacts adapted to be closed upon energization of said winding, a circuit connecting the winding of said relay and said pressure-operated switches with a source of electrical energy, a manually operated, double poled, double throw toggle switch having an intermediate "off" position connected in said circuit for alternately placing one of said pressure-operated switches in circuit with the relay winding, a solenoid circuit connecting one of the pairs of relay contacts with said solenoid and with a source of electrical energy to energize said solenoid and lift said armature to thereby depress said start and stop member when the front wheels of a vehicle pass over the predetermined tube, and a holding circuit connecting another pair of relay contacts with said toggle switch and said relay winding, and with the source of electrical energy to energize said relay winding and thereby maintain said relay contacts in closed position and said start and stop member depressed until the rear wheels of the automobile have passed over said tube and said holding circuit is broken by manual operation of said toggle switch through its "off" position.

2. The combination as defined in claim 1 in which said toggle switch comprises a double pole switch handle pivotally mounted between pairs of terminals, one terminal of each pair of terminals being connected to one of said pressure-operated switches, and the opposite terminals of each pair of terminals being connected to one another.

3. In an apparatus for indicating the rate of speed of a vehicle traveling along the highway, a pair of pressure-operated mercury switches, a compressible tube associated with each switch and extending transversely of the highway in spaced relation a predetermined distance apart, said switches being operable by the front wheels of a vehicle passing over said compressible tubes, a housing, a stop watch mechanism in said housing having a start and stop control member which succesively starts and stops said mechanism upon successive depressions thereof, a dial for said stop watch graduated inversely to time lapse to indicate miles per hour, a solenoid having armature means to depress said stop and start member when said solenoid is energized, a relay with a winding and with normally spaced apart pairs of contacts adapted to be closed upon energization of said winding, a circuit connecting the winding of said relay and said pressure operated switches with a source of electrical energy, a double poled, double throw toggle switch having an intermediate "off" position connected in said circuit for alternately placing one of said pressure-operated switches in circuit with the relay winding, a solenoid circuit connecting one of the pairs of relay contacts with said solenoid and with a source of electrical energy to energize said solenoid and actuate said armature means to thereby depress said start and stop member when the front wheels of a vehicle pass over a predetermined tube, and a holding circuit connecting another pair of relay contacts with said toggle switch and said relay winding, and with the source of electrical energy to energize said relay winding, and thereby maintain said relay contacts in closed position and said start and stop member depressed until the rear wheels of the vehicle have passed over said tube and said holding circuit is broken by operation of said toggle switch through its "off" position.

4. In an apparatus for indicating the rate of speed of a vehicle traveling along the highway, a pair of pressure operated mercury switches, a compressible tube associated with each switch and extending transversely of the highway in spaced relation a predetermined distance apart, said switches being operable by the front wheels of a vehicle passing over said compressible tubes, a housing, a stop watch mechanism in said housing having a start and stop control member which successively starts and stops said mechanism upon successive depressions thereof, a dial for said stop watch graduated inversely to time lapse to indicate miles per hour, a solenoid having armature means to depress said stop and start member when said solenoid is energized, a relay with a winding and with normally spaced apart pairs of contacts adapted to be closed upon energization of said winding, a circuit connecting the winding of said relay and said pressure operated switches with a source of electrical energy, switch means connected in said circuit for alternately placing one of said pressure-operated switches in circuit with the relay winding, a solenoid circuit connecting one of the pairs of relay contacts with said solenoid and with a source of electrical energy to energize said solenoid and actuate said armature means to thereby depress said start and stop member when the front wheels of a vehicle pass over a predetermined tube, and a holding circuit connecting another pair of relay contacts with said switch means and said relay winding and with the source of electrical energy, to energize said relay winding and thereby maintain said relay contacts in closed position and said start and stop member depressed until the rear wheels of the vehicle have passed over said tube and said holding circuit is broken through operation of said switch means to place the other pressure operated switch in circuit with said relay winding.

ROY D. SCHESKE.

References Cited in the file of this patent

UNITED STATES PATENTS

| Number | Name | Date |
|---|---|---|
| 2,091,357 | Goldsmith | Aug. 31, 1937 |
| 2,361,826 | Dowden | Oct. 31, 1944 |
| 2,576,415 | Prather et al. | Nov. 27, 1951 |

OTHER REFERENCES

Popular Mechanics, June 1943, page 40.